Nov. 20, 1962     C. W. ANDERSON     3,064,399

DIAMOND CUT-OFF WHEEL

Filed Aug. 4, 1958

INVENTOR
CLARENCE W. ANDERSON
BY *Allan R Redrow*
ATTORNEY

United States Patent Office 3,064,399
Patented Nov. 20, 1962

3,064,399
DIAMOND CUT-OFF WHEEL
Clarence W. Anderson, Holden, Mass., assignor to Norton Company, Worcester, Mass., a corporation of Massachusetts
Filed Aug. 4, 1958, Ser. No. 752,884
5 Claims. (Cl. 51—206.4)

This invention relates to cut-off wheels and more particularly provides an improvement in segmented saw blades having diamond bearing segments affixed thereto, the structure being particularly adapted to the cutting of "green" concrete or the like.

It has been the usual practice in the past to make diamond bearing saw blades for hard masonry and other such products wherein the blades are provided with a central disk portion formed of relatively soft steel, the periphery of which is adapted to support the cutting means. The drive disks are usually slotted radially to form peripheral teeth on the disk and individual segments of hardened material are adapted to be mounted on the teeth forming the exposed rim of the wheel. For cutting green concrete and other stone and masonry like materials these segments are usually formed with diamond particles dispersed in a tungsten carbide and cobalt matrix and the individual diamond bearing segments are welded to the individual teeth at the rim of the driving disk.

When cutting certain masonry products and referring to "green" concrete particularly, a very abrasive swarf is produced and under certain conditions such swarf tends to undercut the joint between the harder diamond segments and the teeth of the softer driving disk. Not infrequently the undercutting becomes so severe that one or more of the diamond containing segments are torn free of the drive disk before substantially all of the diamond cutting section has been worn through. This is, of course, undesirable and while the saw wheel can be operated with one or two segments missing, it is preferable to provide a structure which will not break down, at least until nearly all the useful life of the relatively expensive diamond segments have been used up.

Various proposals have been offered to overcome the under-cutting action of the swarf in order to prolong the life of such cutting wheels. The present invention provides an improvement in such constructions and shows an improved junction construction for attaching the diamond-bearing segment to the driving disk. In order to overcome this under-cutting problem in following the teaching of this invention, an angularly disposed junction line is provided between each of the teeth on the disk and the diamond-bearing segments affixed thereto. The more complete aspect of the teaching comprehends that the slanting junction line shall be so disposed with respect to the direction of rotation of the wheel that the leading end of the line is nearer to the center of the wheel than the trailing end.

The preferred form of the invention is shown and described herein wherein.

Figure 1:
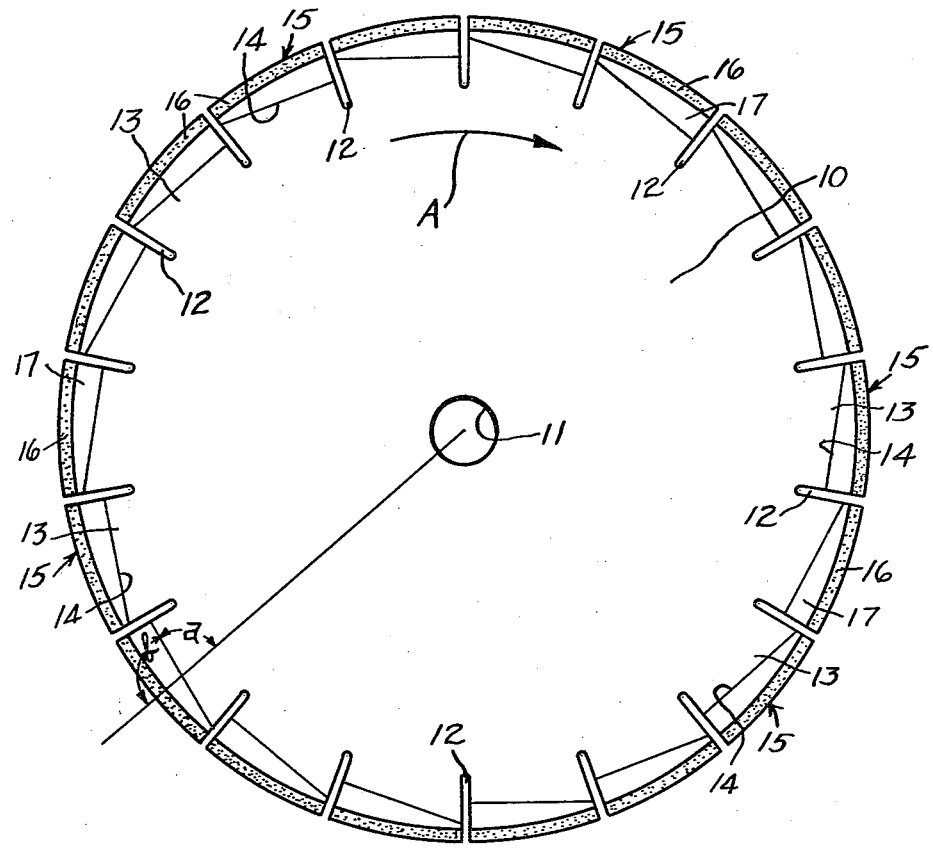
FIGURE 1 is a side view of a concrete cut-off wheel showing the preferred junction construction.
Figure 2:
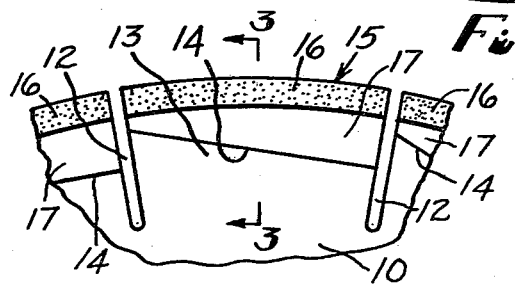
FIGURE 2 is a detailed view showing a segment containing the abrasive diamond particles affixed to one of the peripheral teeth of the driving disk.

The general form of cutting wheel of this type is well known and typically the cut-off wheel of this invention includes a relatively thin center driving disk 10 having an aperture 11 formed at the center thereof for mounting the wheel on suitable powered driving means. The driving disk is ordinarily formed of a relatively thin steel sheet having sufficient rigidity to support the abrasive cutting segments for driving against the material to be cut. The driving disk is provided with a plurality of radially disposed slots 12 generally equally spaced around its periphery to form tooth portions 13 at the rim of the disk. Each tooth portion is finished to have a preferably straight edge 14 which may be cut at any convenient angle for a purpose which will be described more fully below.

A plurality of individual segments 15 having diamond particles embedded therein are adapted to be mounted on the teeth integral with the rim, each segment 15 forming an individual cutting tooth cooperating with all the other segments to form the periphery of the wheel. These diamond bearing segments are well known in the art and may be formed and affixed to the driving disk 10 in the manner taught in my prior Patent No. 2,796,706.

Briefly stated, however, the diamond bearing segments as there described provide an exposed cutting edge 16 formed by dispersing and supporting from 2% to 6% by weight or so of diamond particles in a matrix which for the purposes of this invention may have 50% tungsten carbide and 50% cobalt by weight having particle sizes in the range of two to five microns. The segment is formed by hot-pressing the diamond particles, tungsten carbide and cobalt in a well known manner for a few minutes in a suitable furnace. The diamond-bearing portion of each segment may be formed integral with an inner section 17 which may be composed of the same matrix composition but without having the diamond particles distributed throughout its mass.

While the above described segment will perform quite satisfactorily in most situations, it has been found that sometimes an additional abrasive ingredient may advantageously be added to the matrix in the form of grits of sintered tungsten carbide and cobalt of approximately 80 to 180 mesh sizes and having a composition of from 90% to 96% by weight of tungsten carbide. These grits assist in the abrasive cutting action and also aid in controlling the hardness of the matrix of the segment that is formed in the hot pressing process. The relationship is such that the greater the percentage of sintered grits present, the harder the resulting matrix. In following my invention sintered grits may be added in the proportion of from about 2% to above 12% by weight. The preferred matrix composition for holding the diamond particles dispersed for cutting green concrete, is a primary tungsten carbide and cobalt molding powder in equal amount with about 6% by weight of sintered carbide grits which themselves have a composition of 96% WC and 4% C by weight.

The inner diamond-free section 17 of the segment is preferably thinner than the diamond bearing portion and may be formed to have a thickness substantially the same as the thickness of the drive disk. The inner edge of the section 17 of the segment may be finished to have surface adapted to be joined to edge 14 of a drive disk tooth 13. The shape of each segment is such that when the inner edge of the segment is brazed to edge 14, the outer edge or periphery of the diamond portion 16 is concentrically disposed with respect to the center of the disk 10.

It will be noted, due to the angular disposition of edge 14, that a radius drawn from the center of the disk 10 and passing through the junction on edge 14 will intersect the junction line in such manner that the angle $a$ is always less than angle $b$, and thus angle $a$ is always less than 90°. The exact angle of the junction line is not critical and is selected merely to be something less than 90° and preferably is designed to be formed at an angle which lends itself to ease of machining during intermediate manufacture of the drive disk 10. The preferred slanting relationship of the junction line to the direction of rotation of the wheel is seen in FIGURE 1 wherein the arrow at the top of the wheel indicates the direction of rotation. The cooperation between the slant of the junction line with respect to the direction of rotation is such that the leading end is closer to the center of the wheel than the trailing end in the preferred form of the invention.

The individual segments may be made as above indicated to have any of the various compositions known to those skilled in the art. Any such segments may be formed to have an inner edge adapted to be attached to a drive disk as here taught and it will be found that the cutting wheel will have a much longer life even though abrasive swarf may be rubbed against the sides of the thin inner section 17 of the segment and the sides of the drive disk along the junction line during the cutting of such materials as "green" concrete.

Figure 5:
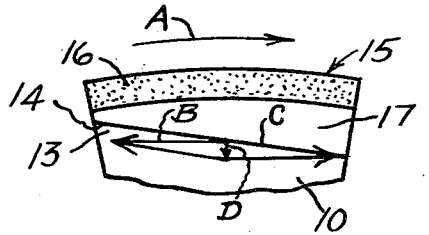
FIGURE 5 is a vector diagram showing a resolution of the driving force as transmitted from the drive disk to a segment.

Preferably the segments attached as here taught are designed to be driven into the material being cut in the direction of the arrow as shown in FIGURE 1 and the segments are made to bear against the material being cut producing stresses within the drive disk that may be represented in very simplified form by the vector diagram illustrated in FIGURE 5. Vector B represents the reaction to the driving force which may be considered as having a direction tangent to the periphery of the cutting wheel at any one point. When the wheel is driven in the direction of the arrow A, the segment would tend to ride up on the edge 14 which sliding action is resisted by a force as represented by the vector C. The resultant of the reaction forces B and C produces a force in the direction of vector D, the magnitude of which is controllable and in general is proportional to the driving force and the angle of the junction line 14. It is evident that when the junction line is sloped in the direction shown relative to the direction of rotation of the wheel, that vector D represents a positive and constructive force tending to hold the segment affixed to driving disk. As distinguished from arcuate junction lines, concentric with the center of the drive disk, such as have heretofore been almost universally used, in following my teaching a substantial force is thus provided by the normal reaction of the segment and drive disk elements of the wheel, which force contributes to holding those elements together in a manner to assist in prolonging the life of the wheel.

Figures 3, 4:
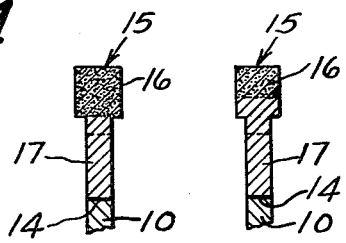
FIGURE 3 is a view taken on the line 3—3 of FIGURE 2.
FIGURE 4 is a view similar to FIGURE 3 but showing a cross-sectional construction of a modified form of a segment.

A modified form of segment is shown in FIGURE 4, which has a different cross sectional form. In this segment, the diamond-free section 17 is generally T-shaped and is disposed relative to the diamond containing portion so that the cross of the T serves to back up the diamond particle cutting edge while at the same time providing a stem portion of reduced thickness for joining the segment to the drive disk 10. In this form of segment, the cross of the T serves to support the abrasive diamond cutting means until the diamond section is substantially completely worn through. Further, the exposed ends of the cross of the T element tend to form hard bearing surfaces for engaging the wall of the slot being cut in a manner which tends to prevent breakdown of the side walls of the diamond cutting portion. In combination with its supporting function, this segment includes the relatively thin stem element of about the same thickness as the drive disk which permits the swarf to flow along the sides of the drive disk of the cutting blade until it can be flushed away thereby minimizing the frictional contact between the reduced side wall of the segment and the side wall of the drive disk.

The modified form of segment shown in FIGURE 4 is adapted to be affixed to the drive disk 10 in the manner shown in FIGURE 1. It will, of course, derive all the advantages from such a mode of attachment as have been described above.

Either of the segments described herein or other equivalent segments may be attached to a drive disk as here taught and the resulting wheel used for cutting masonry products or other similar hard materials. From the standpoint of mere swarf abrasion, the invention here described will be found useful irrespective of the direction of wheel rotation. The slant-line junction has the effect of spreading out the exposure of the junction line to the abrasive swarf flow and a longer life is thus accomplished. However, when the particular junction line construction is coordinated with the direction of wheel rotation as explained in connection with the vector diagram of FIGURE 5, additional advantages are realized while retaining the same spread of exposure of the junction to the abrasive swarf action.

After a wheel has been constructed in accordance with the teachings of this invention, it may be mounted on any of the conventional wheel driving means for cutting masonry or other hard product. Preferably the wheel is mounted to rotate in the direction indicated by the arrow A in FIGURE 1 relative to the direction of slant of the junction line. When this is done, the abrasive swarf produced by driving the blade relatively into the product to be cut, can flow along the side of the section 17 of the segment and side of the drive disk 10. The construction provides a maximum of space for swarf and flushing fluid flow while at the same time providing an improved junction line construction for mounting the individual segments on the drive disk.

While the above description covers the preferred construction of this invention, it is apparent that many modifications of this invention may occur to those skilled in the art which will fall within the scope of the following claims:

I claim:

1. A diamond wheel for cutting hard material including green concrete or the like, said wheel having a relatively thin center drive disk portion with a rim formed of segments producing a harder peripheral portion containing diamond particles for engaging the material, comprising a plurality of separate segments affixed to the rim of said disk to form said harder peripheral portion, each segment having a cutting edge containing diamond particles adapted to cooperate with the cutting edge of all the other segments which form the peripheral portion of said disk, and an attaching portion on each segment for affixing it to the disk, said attaching portion being relatively thin and of substantially the same thickness as the disk, each of said attaching portions of each of said segments being fixed to said disk along a junction line all points of which are situated at different distances away from the center of the disk.

2. A diamond wheel for cutting hard material including green concrete or the like, said wheel having a relatively thin center drive disk portion with a rim of segments producing a harder peripheral portion containing diamond particles for engaging the material, comprising a plurality of separate segments affixed to the rim of said disk to form said harder peripheral portion, each segment having a cutting edge containing diamond particles adapted to cooperate with the cutting edge of all the other segments which form the peripheral portion of said disk, and an attaching portion on each segment for affixing it to the disk, said attaching portion being relatively thin and of substantially the same thickness as the disk, each of said attaching portions of each of said segments being fixed to said disk along a straight junction line disposed at an angle of less than a right angle with respect to a line drawn through the center point of the disk.

3. A diamond wheel for cutting hard material including green concrete or the like, said wheel having a relatively thin center drive disk portion with a rim formed of segments producing a harder peripheral portion containing diamond particles for engaging the material, comprising a plurality of separate segments affixed to the rim of said disk to form said harder peripheral portion, each segment having a cutting edge containing diamond particles bonded in a tungsten carbide cobalt matrix, the cutting edge of each segment being adapted to cooperate with the cutting edge of all the other segments which form the peripheral portion of said disk, and an attaching portion on each segment, said attaching portion being formed of a diamond free tungsten carbide cobalt material adapted to be ground to have a given shape for affixing it to the disk, said attaching portion being relatively thin and of substantially the same thickness as the disk, each of said attaching portions of each of said segments being fixed to said disk along a junction line having said given shape, and such shape being such that all points thereof are situated at different distances away from the center of the disk.

4. A driven rotating diamond wheel for cutting hard material including green concrete or the like, said wheel having a relatively thin center drive disk portion with a rim formed of segments producing a harder peripheral portion containing diamond particles for engaging the material, comprising a plurality of separate segments affixed to the rim of said disk to form said harder peripheral portion, each segment having a cutting edge containing diamond particles adapted to cooperate with the cutting edge of all the other segments which form the peripheral portion of said disk, an attaching portion on each segment for affixing it to the disk, said attaching portion being relatively thin and of substantially the same thickness as the disk, and each of said attaching portions of each of said segments being fixed to said disk along a straight junction line, said line having a leading and trailing end as said wheel rotates and said line being positioned relative to the direction of rotation of the wheel such that the leading end of said line is closer to the center point than the trailing end, and the angle formed between the leading edge of the junction line and the radius being less than a right angle.

5. A segmented diamond cut-off wheel adapted to be rotated in a given direction for cutting hard material such as concrete or the like, comprising a relatively thin drive disk having a plurality of diamond bearing segments affixed to the rim thereof, each of said segments including a cutting edge section wherein said diamonds are exposed to perform an abrasive cutting action and a thinner attaching section, said thinner section being approximately the same thickness as the drive disk, each of said attaching sections of said segments being fixed to said disk on a straight junction line, said junction line having a leading and trailing end as said wheel is rotated, and said junction line being sloped with respect to the direction of rotation of said wheel such that the leading end of the junction line is closer to the center than the trailing end thereof, and the angle formed between the leading edge of the junction line and the radius being less than a right angle.

References Cited in the file of this patent

UNITED STATES PATENTS

| 2,796,706 | Anderson | June 25, 1957 |
| 2,815,746 | Schwarzkopf et al. | Dec. 10, 1957 |

FOREIGN PATENTS

| 564,328 | Great Britain | Sept. 22, 1944 |